(12) United States Patent
Mercat et al.

(10) Patent No.: US 8,215,720 B2
(45) Date of Patent: Jul. 10, 2012

(54) SPOKE WHEEL ASSEMBLED WITHOUT TENSION OR COMPRESSION

(75) Inventors: Jean-Pierre Mercat, Chavanod (FR); Olivier Mouzin, Montmin (FR)

(73) Assignee: Salomon S.A.S., Metz-Tessy (FR)

( * ) Notice: Subject to any disclaimer, the term of this patent is extended or adjusted under 35 U.S.C. 154(b) by 129 days.

(21) Appl. No.: 12/300,554

(22) PCT Filed: May 4, 2007

(86) PCT No.: PCT/FR2007/000770
§ 371 (c)(1),
(2), (4) Date: Nov. 12, 2008

(87) PCT Pub. No.: WO2007/135260
PCT Pub. Date: Nov. 29, 2007

(65) Prior Publication Data
US 2009/0160243 A1    Jun. 25, 2009

(30) Foreign Application Priority Data
May 12, 2006  (FR) ...................................... 06 04237

(51) Int. Cl.
*B60B 1/06* (2006.01)
(52) U.S. Cl. ........ 301/75; 301/67; 301/104; 29/894.341
(58) Field of Classification Search .................... 301/66, 301/67, 68, 69, 70, 71, 72, 73, 74, 75, 77, 301/104, 58, 59; 29/894.34, 894.341, 894.342, 29/894.343
See application file for complete search history.

(56) References Cited

U.S. PATENT DOCUMENTS

| | | | | |
|---|---|---|---|---|
| 1,433,435 A | | 10/1922 | Van Horn | |
| 1,457,808 A | * | 6/1923 | Adams | 29/894.345 |
| 1,763,413 A | * | 6/1930 | Wilcox | 301/67 |
| 2,994,560 A | | 8/1961 | Carlson | |
| 4,729,605 A | * | 3/1988 | Imao et al. | 301/104 |
| 5,110,190 A | | 5/1992 | Johnson | |
| 5,350,221 A | * | 9/1994 | Pearce et al. | 301/104 |
| 5,647,643 A | | 7/1997 | Noble | |
| 6,086,161 A | * | 7/2000 | Luttgeharm et al. | 301/95.102 |
| 6,145,938 A | | 11/2000 | Dietrich | |
| 6,158,819 A | * | 12/2000 | Okajima et al. | 301/58 |

(Continued)

FOREIGN PATENT DOCUMENTS

CH        91 759 A    11/1921

(Continued)

OTHER PUBLICATIONS

U.S. Appl. No. 12/300,585 (Jean-Pierre Mercat et al.), which is a national stage of PCT/FR2007/000767, filed on May 4, 2007.
G. Schraner, The Art of Wheelbuilding, Denver, Colorado, Buonpane Publications, 1999, pp. 16-28, 40-48.
A. Sharp, Bicycles and Tricycles, Cambridge and London, The MIT Press, 1977 (reprint of 1896 Ed.), pp. 337-339.

*Primary Examiner* — Kip T Kotter
(74) *Attorney, Agent, or Firm* — Greenblum & Bernstein, P.L.C.

(57) ABSTRACT

The invention relates to a spoke wheel that includes a peripheral rim, a central hub, and individual connecting spokes between the rim and the hub. In their free state, the spokes of the wheel are mounted without tension or compression between the rim and the hub, and each spoke can bear a compression load of at least 60 daN without bowing. Furthermore, the wheel includes a play-free connection or bilateral connection device for connecting at least one end of each spoke to the rim or the hub.

25 Claims, 8 Drawing Sheets

U.S. PATENT DOCUMENTS

| | | |
|---|---|---|
| 6,196,638 B1 | 3/2001 | Mizuno et al. |
| 6,224,165 B1 | 5/2001 | Mercat et al. |
| 6,367,883 B1 | 4/2002 | Chen |
| 6,557,946 B1 * | 5/2003 | Gerrit et al. .................... 301/104 |
| 6,588,853 B2 | 7/2003 | Okajima |
| 2002/0149257 A1 * | 10/2002 | Miansian et al. ............... 301/74 |
| 2003/0038530 A1 | 2/2003 | Meggiolan |
| 2003/0107260 A1 | 6/2003 | Ording et al. |
| 2004/0026986 A1 | 2/2004 | Jager |
| 2004/0195908 A1 | 10/2004 | Main |
| 2005/0023884 A1 | 2/2005 | Chiang et al. |
| 2005/0253446 A1 | 11/2005 | Okajima |
| 2006/0108858 A1 | 5/2006 | Mercat et al. |
| 2006/0181140 A1 | 8/2006 | Mercat et al. |
| 2009/0184565 A1 | 7/2009 | Mercat et al. |

FOREIGN PATENT DOCUMENTS

| | | |
|---|---|---|
| DE | 203 13 846 U1 | 1/2004 |
| EP | 1 016 552 A2 | 7/2000 |
| EP | 1 316 442 A2 | 6/2003 |
| EP | 1 595 721 A2 | 11/2005 |
| FR | 1 019 285 A | 1/1953 |
| FR | 2 701 899 A1 | 9/1994 |
| FR | 2 750 913 A1 | 1/1998 |
| FR | 2 881 682 A1 | 8/2006 |
| WO | WO-2004/033231 A2 | 4/2004 |
| WO | WO-2004/108514 A1 | 12/2004 |
| WO | WO-2007/135259 A1 | 11/2007 |

* cited by examiner

SPOKE WHEEL ASSEMBLED WITHOUT TENSION OR COMPRESSION

BACKGROUND OF THE INVENTION

1. Field of the Invention

The invention relates to a new design of a compression spoke wheel, in particular a cycle wheel. The invention also relates to a compression spoke wheel having at least one such compression spoke, as well as a rolling apparatus, in particular a cycle, equipped with at least one such wheel.

2. Description of Background and Other Information

The wheel has existed since the mists of time. The first wheels were solid wheels. A first improvement consisted in building compression spoke wheels, which were lighter. The spokes of such wheels were biased in compression and in flexion by a rim. Then, the wheel was ringed by a metal hoop and the compression spokes were pre-stressed in compression. The patent document CH 91759 describes such a mode of construction.

The invention of the tension wire spoke wheel goes back to around 1866, and is credited to Eugène Meyer. This invention made it possible to build wheels with spokes having a considerably decreased cross section, resulting in a substantial weight reduction. It also became possible to increase the wheel diameter, and therefore to increase its size, as was the case with the steel high-wheels whose pedals were in direct engagement with the driving wheel. The terms "traction" and "tension" are used interchangeably herein to describe a spoke having a positive tension.

Conventionally, a currently available spoke wheel includes a peripheral rim provided to receive a tire, a central hub, and connecting spokes between the rim and the hub. The number of spokes is variable depending upon the type of wheels; it generally varies between twelve and forty. As a general rule, the spokes are distributed in two sets, each of which connects the rim to a respective one of the ends of the hub. The spokes of each set form an angle with the median plane of the rim, which is commonly referred to as the dish angle.

The spokes structurally connect the rim and the hub, which makes it possible to provide the wheel with good rigidity and good fatigue strength. The external loads to which a wheel is subjected during use can be divided into a radial force directed along the median plane of the rim, a lateral force directed perpendicular to this such plane, and a motive force or, conversely, a braking force tangent to the wheel circle, which corresponds to the transmission of torque between the hub and the rim.

Constructions of wheels other than tension spoke wheels currently exist. For example, solid wheels or so-called compression spoke wheels are known, which are made out of composite material and are used mainly for their aerodynamic properties. The patent documents WO 2004/033231 and FR 2701899 describe such wheels. There are also molded wheels made out of light alloy (aluminum, magnesium or titanium). Such wheels are known, for example, from patent documents EP 1016552 and WO 2004/108515.

In the case of so-called compression spoke wheels made of composite material, or of molded alloy, the compression spokes are in a smaller number, about three to five compression spokes per wheel. Indeed, these spokes, which must withstand compressive forces, have a much larger cross section than the usual common spokes to avoid buckling, and their dimensions themselves do not allow a greater number of compression spokes to be used.

However, among these various modes of wheel construction, the tension spoke wheel still offers the best compromise between lightness and strength, provided that it is well built and properly adjusted.

However, although tension spoke wheels yield good results, they nevertheless have several disadvantages.

First, the spoke tension produces compressive stresses in the rim body. It is estimated that for a road bike wheel having 36 spokes, with each spoke being tensioned to 1000 Newtons, the compressive force resulting in the area of the rim body is 5730 Newtons, which produces a compressive stress of 88 MegaPascals (MPa), which, for a material commonly used for a rim (aluminum 6106, for example), already represents 40% of the material inherent strength potential (220 MPa). In other words, this resultant compression already weakens the rim considerably.

In addition, for a rim 622 millimeters (mm) in diameter, this compressive force leads to a reduction in the rim perimeter of up to 2.5 mm, which, naturally, can have an impact on the connection between the rim and the tire, and can lead to ill-timed tire roll offs and accidents.

Second, the spoke tension is exerted on the rim locally. Each spoke, via its tension, produces a local shearing force in the area of its attachment zone, as well a variable bending moment between each spoke hole. The bending moment leads to a polygonal deformation of the rim, commonly referred to as a "jump", with a local lateral run-out or deformation in the area of each spoke attachment zone.

The patent documents EP 1316442 and FR 1019285, providing for paired spoking patterns, illustrate these two phenomena for which they attempt to find a solution. It is noted in passing that attaching the spokes by pairs in the area of the rim, as described in the document EP 1316442, does attenuate the effect of local lateral run-out, but accentuates the polygonal effect.

To solve this problem, EP 1316442 proposes to start with a rim that is pre-deformed in an opposite configuration (see FIG. 5 of this patent), which is difficult to implement.

Lastly, it has been observed that the service life of a wheel, i.e., of each of its components, is substantially inversely proportional to the tension of the spokes. During wheel rotation, each spoke is subject to a loading and unloading cycle, and each spoke locally subjects the rim to such a loading and unloading cycle. These repeated cycles result in damage to the spoke, the hub, or the rim, and this all the more quickly as the tension in the spoke is high. Consequently, the currently available tension spoke wheels do not have an optimal service life. In view of this state of the art, there exists a need for a wheel construction that reconciles lightness, rigidity, strength, and optimal service life.

There also exists a need for a wheel whose geometrical characteristics (lateral run-out, jump, perimeter) remain as stable as possible.

SUMMARY OF THE INVENTION

The aforementioned objects and other objects, which will become apparent from the description that follows, are achieved by the invention.

In particular, the spoked wheel according to the invention, is a wheel including a peripheral rim, a central hub, and individual connecting spokes between the rim and the hub, the spokes, in the free state, being assembled without tension or compression between the rim and the hub, and with each spoke being able to withstand a compression load of at least 60 decaNewtons (daN) without buckling. In addition, the wheel has a greater number of spokes than compression spoke wheels and comprises, for example, more than ten spokes. Such a construction has the advantage of reducing all of the stresses within the spokes of the rim to zero, in the free state. Consequently, the spokes are provided to be capable of withstanding a substantial compressive force, without buckling, in order to be able to withstand the forces being exerted in the wheel during use.

Such a construction contradicts the generally accepted ideas about wheel construction, according to which when the wheel is in the free state, i.e., non-loaded, either the spokes are pre-stressed by the rim and then have strong cross sections in order to be capable of withstanding the compressive forces, or the spokes are pre-tensioned and then pre-stress the rim.

The principle underlying the invention, i.e., eliminating any (or almost any) stress within the wheel (rim, spokes), when in the free state, makes it possible to increase the overall strength of such a wheel substantially. In addition, such a wheel has the following advantages:

the wheel no longer has any tension, the rupture of a spoke no longer producing any lateral run-out or deformation as in a tension or compression spoke wheel, the wheel no longer has any residual stresses; it is thus less biased and can therefore be made lighter, the spokes and their ends are much less biased in tension and are thus stronger, as are the rim and the hub, the wheel is more resistant to fatigue (less stress), the wheel no longer has any polygonal effect at all, or any induced lateral run-out, if a spoke is broken, it can be replaced by removing the old one and by attaching a spoke directly to the wheel, without any particular assembly.

Furthermore, contrary to a wheel having a few compression spokes, less than six in principle, lateral rigidity is almost constant, which is not true of wheels with three compression spokes, for example; and frontal rigidity is not too high and substantially constant, which provides the cyclist with a comfortable wheel with respect to frontal impacts due to the irregularities of the road.

According to one embodiment, each spoke comprises a body having an outer diameter that is greater than 4.8 mm and an inner diameter that is less than 15 mm. Compared to known conventional spokes, the spokes therefore are tubular spokes, having a greater outer diameter. This makes it possible to increase the (buckling) strength upon compression of the spoke without increasing the weight thereof. Spokes having a non-tubular cross section, such as an I-shaped transverse cross section, for example, can also be used.

Spokes according to the invention can have a non-constant cross section in the longitudinal direction, and the spoke can have a cross section having a variable shape along the longitudinal direction, such as, for example, a larger cross section in the median zone in order to withstand buckling more efficiently.

BRIEF DESCRIPTION OF THE DRAWINGS

In any event, the invention will be better understood, and other characteristics thereof will become apparent by means of the description below, with reference to the schematic drawings annexed thereto, showing by means of non-limiting examples, several embodiments of the invention, and in which.

DETAILED DESCRIPTION OF THE INVENTION

Figure 1:
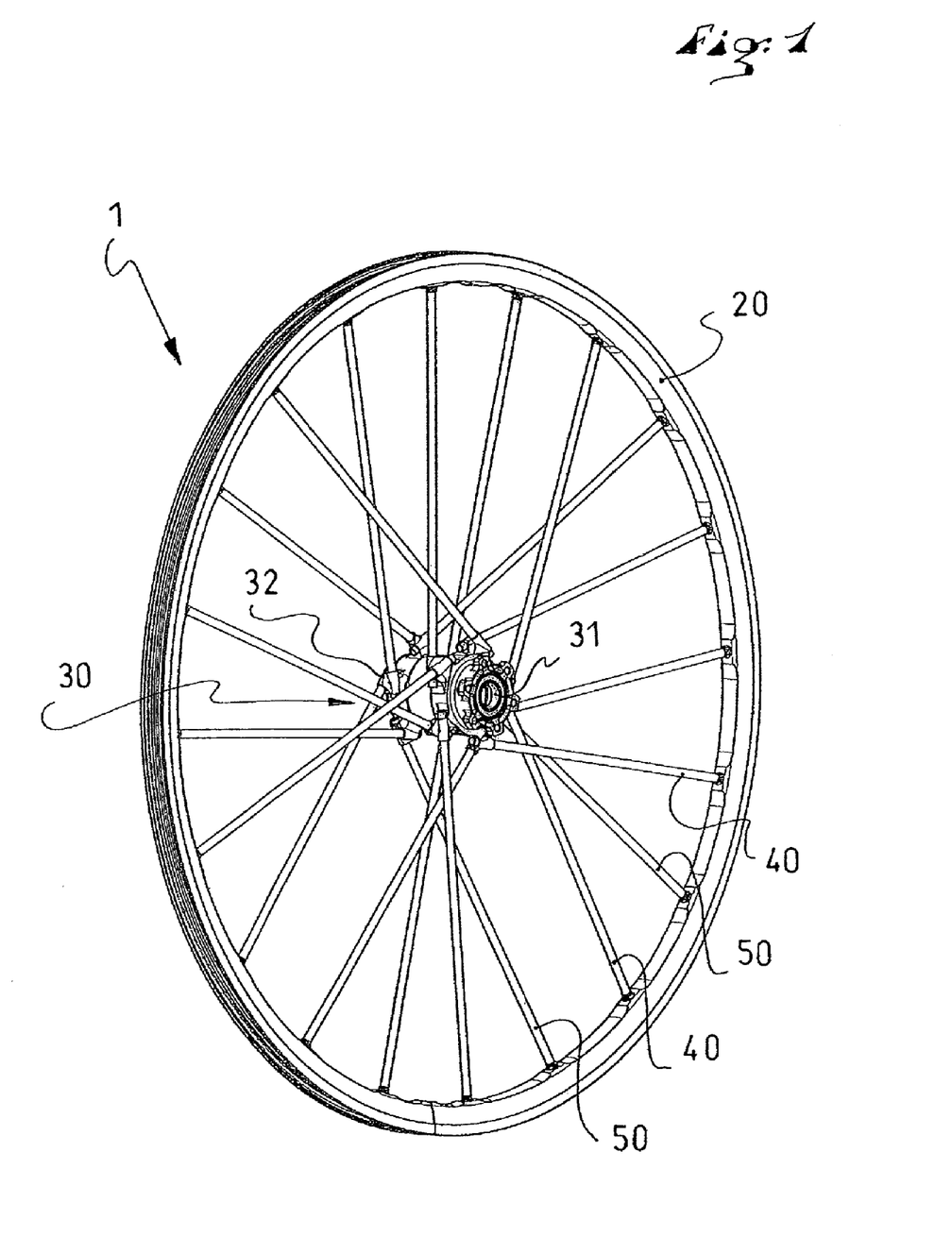
FIG. 1 is a perspective view of a wheel incorporating the construction according to the invention.

The wheel 1 according to the invention, shown in FIG. 1, conventionally includes a peripheral rim 20, a central hub 30, and connecting spokes 40, 50 extending between the rim 20 and the hub 30. The spokes 40, 50 are distributed in two sets, each set of spokes 40, 50 being attached to one end 31, 32, respectively, of the hub 30, and extending from the end 31, 32, respectively, from the hub towards the rim 20. The spokes 40, 50 are attached to the rim 20 alternately with the spokes 50, the spokes 40, 50 being distributed evenly along the periphery of the rim. They can also be distributed, as known, on the various sets in predetermined groups on the tension spoke wheels, as described, for example, in U.S. Pat. No. 6,145,938.

Each set of spokes 40, 50 comprises ten in number, or a total of twenty, which is a much greater number than the number of compression spokes in a so-called compression spoke wheel, having a maximum of six compression spokes, and a smaller number than the usual number of spokes in a tension spoke wheel having about 12 to 40 spokes. This number of spokes can be reduced to 10 on both of the two sets.

Figure 7:
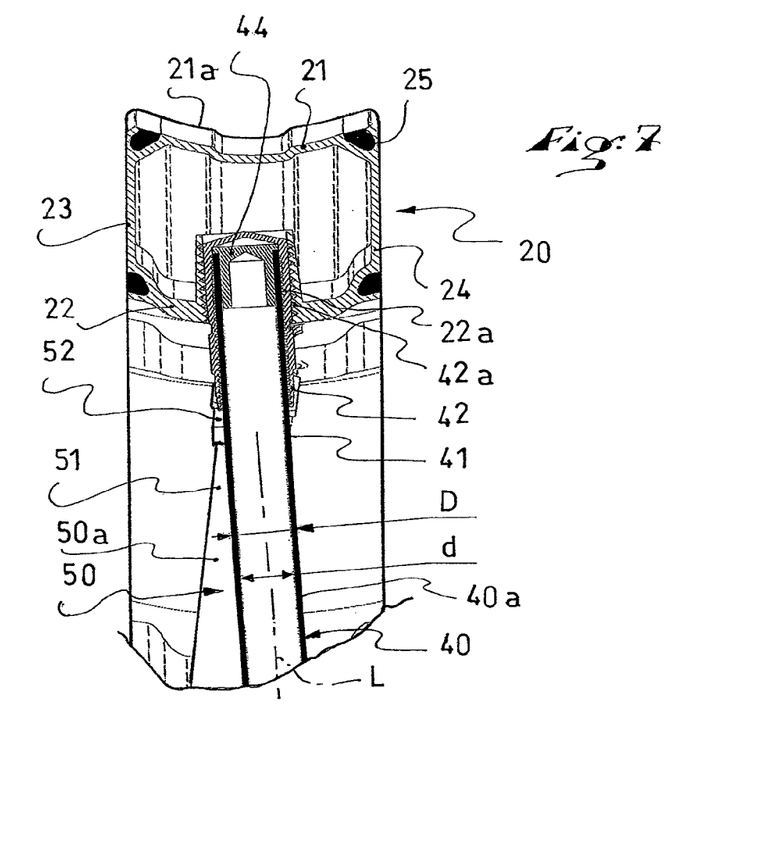
FIG. 7 is a al view along the line VII-VII of FIG. 5 showing the attachment of the spokes in the area of the rim.

The rim 20 is of any appropriate type, and has, as shown for example in FIG. 7, a hollow metal box-structure with an upper bridge 21 having a channel 21a for receiving a tube at its periphery, a lower bridge 22 having threaded chimney-shape openings 22a for attaching the spokes, and two side walls 23, 24 connecting the two bridges. The threaded chimneys 22a can be created by flow drilling, as described in the patent document FR 2 750 913. In the example shown, the box is further reinforced in each corner by a circular band 25 made of carbon, as described in the patent document FR 2 881 682.

Any other shape is suitable for the rim. In particular, the rim can have a single bridge, a receiving channel 21a that has a different shape and in particular is capable of receiving a tire.

According to the invention, the spokes 40, 50, in the free state (i.e., without a load on the wheel), are assembled without tension or compression between the rim 20 and the hub 30, and each spoke can withstand a compressive load of at least 60 daN. That is, the spokes 40, 50 can withstand a net load in compression, i.e., a compressive load minus any tensile load (zero in the invention), of at least 60 daN.

Figures 8, 9, 10:
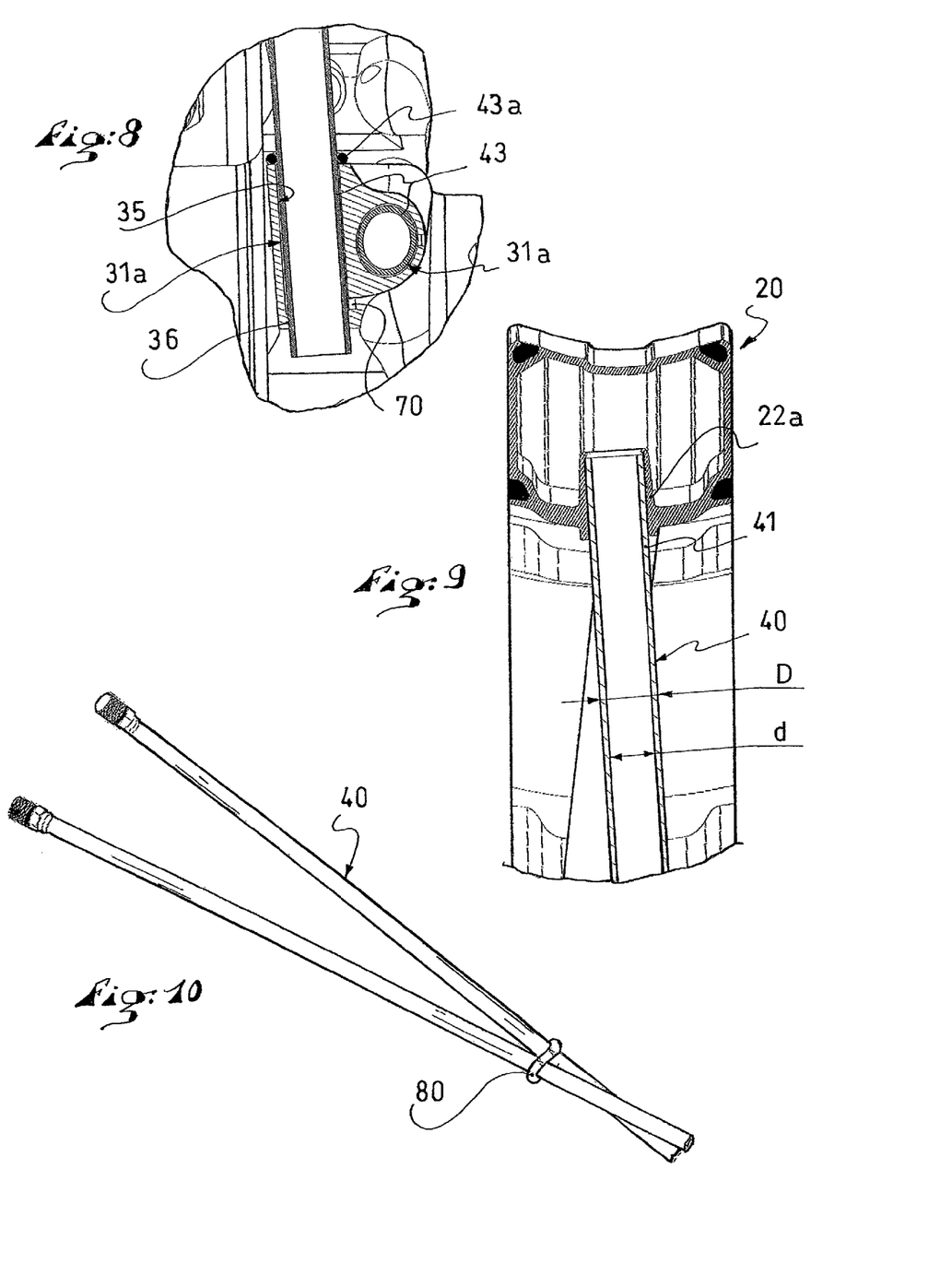
FIG. 8 is a al view along the line VIII-VIII of FIG. 6.
FIG. 9 is a view similar to FIG. 7 according to another embodiment.
FIG. 10 is a view showing an example of binding two spokes.

To obtain such a characteristic, each spoke 40, 50 comprises, as shown in FIGS. 7 and 8, an elongated body 40a, 50a, respectively, defining a longitudinal direction L for each spoke, and comprising two attachment ends 41, 51 and 43, 53, respectively. In addition, the body 40a, 50a of each spoke is a tubular body having, for example, a circular or elliptical cross section, made of a material having high strength properties and, in particular, made of pultruded carbon.

According to one exemplary embodiment, starting from current HR (high strength) pultruded carbon fibers and from an epoxy resin matrix having an overall modulus of 115 GigaPascals (GPa), each spoke 40, 50 has an outer diameter D that is greater than 4.8 mm, (5.5 mm, for example), i.e., no less than 4.8 mm, and an inner diameter d that is less than 15 mm (4.1 mm, for example) with a wall thickness of 0.7 mm, such wall thickness being capable of being decreased in the event of a (tubular) hollow spoke filled with foam, for example. Various values can also be obtained depending upon the materials and, for example, if HM (high modulus) carbon fibers having a modulus higher than 200 GPa are used. In practice, the spokes adapted to a wheel of this type are selected so that their EI characteristics are greater than $10^6$ Nmm$^2$, for a spoke having a normal length (which would in fact be equivalent to the EI value of a steel spoke 3.2 mm in diameter and therefore too heavy for use in a wheel, such steel spokes generally having a diameter of 2 mm).

Such dimensions have been obtained by calculation and have been verified by practical tests, in order to reconcile two contradictory requirements, namely, to have one quadratic bending moment I of the spokes that is the largest possible, in order to withstand the high compressive forces being exerted successive on each spoke during use of the wheel, owing to the fact that these spokes are not initially pre-tensioned (the tension opposing the compression load generated during use), and to limit to the maximum the risk of buckling, on the one hand, and to reduce the mass of the spokes as much as possible so as not to increase, even to reduce the mass of the wheel, on the other hand.

Indeed, the mass M of a spoke is given by the formula:

$$M = L\rho S = L \cdot \rho \cdot \pi \cdot (D^2 - d^2)/4$$

L is the length of the spoke,
ρ is the density of the material (g/mm$^3$),
D is the outer diameter (mm),
d is the inner diameter (mm),
S is the cross section of the spoke.

Furthermore, the maximum compressive force (buckling) is given by the following relationship:

$$F = \pi^2 EI/(KL)^2 = \pi^3(D^4 - d^4)E/[64(KL)^2]$$

with coefficient K being a function of the construction of the end connections,
K=0.5 for embedded end/embedded end (i.e., each end of the spoke is embedded),
K=1 for ball-joint end connection/ball-joint end connection,
K=2 for embedded end/free end,
K=4 for free end/free end,
E is the Young's modulus of material in MPa,
I is the quadratic moment (mm$^4$)=π(D$^4$−d$^4$)/64 for a tubular cross section,
L is the length of the beam (mm)(i.e., spoke) between supports.

By combining these two formulas, it has been observed that with a constant cross section, the increase in the outer diameter D makes it possible to reduce the thickness of the tube, but also to very quickly increase the allowable buckling force. Thus, in comparison, a tubular spoke with D =4 mm, d=2.65 mm, made out of pultruded carbon fiber having a modulus of 115 GPa, withstands a compressive force of 55 daN, whereas a spoke with a diameter D =6 mm, d =5.2 mm, made out of an identical material, withstands a buckling load of 152 daN, that is to say almost three times more, although it has the same mass. Such a spoke is sufficient to build a bicycle wheel with eighteen spokes that are not tensioned under normal conditions of use, the maximum force on each spoke then being less than 140 daN. A certain amount of spoke buckling is allowable under certain conditions, as long as any risk of rupture of the spoke is avoided. The product "E·I" is important to resistance to compression force.

To guarantee a load-free assembly, i.e., without tension or compression, of each spoke 40, 50, the wheel includes a device for the play-free connection, or bilateral connection, of at least one end of each spoke 40, 50 to the rim or to the hub.

This connecting device and the assembly of the spokes are described below, with reference to FIGS. 2 to 8.

Figure 2:
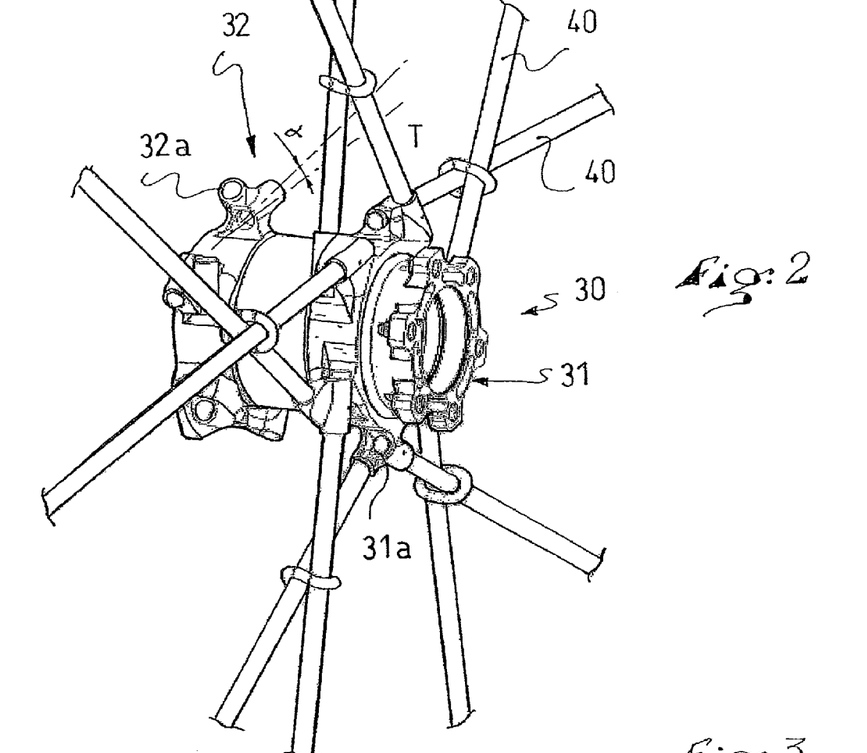
FIG. 2 is a detailed view, on an enlarged scale, of the spoke assembly in the area of the hub.
Figure 3:
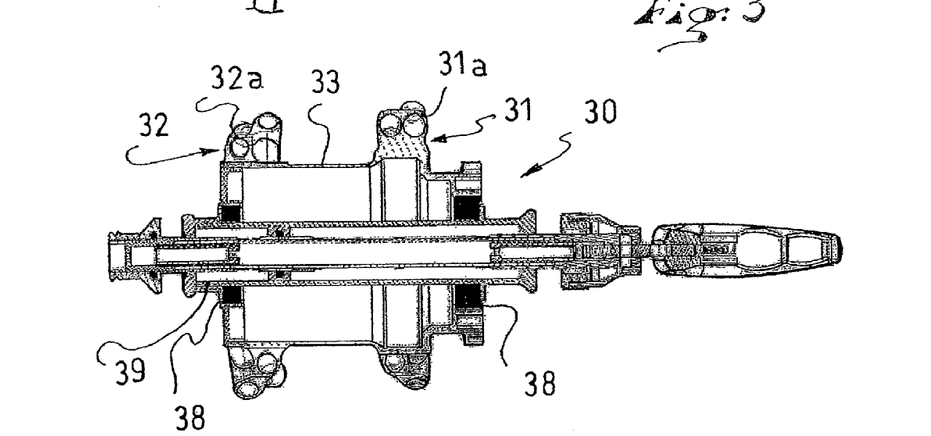
FIG. 3 is a longitudinal al view of the hub of FIG. 2, without the spokes.

First, as shown particularly in FIGS. 2 and 3, the hub 30 comprises a tubular body 33 rotationally mounted by means of bearings 38 on a shaft 39, adapted to receive the rotational axle of the wheel, and two ends 31, 32 for attaching the spokes. Each end 31, 32 generally has the shape of a disc or flange extending radially from the tubular body 33.

Figure 6:
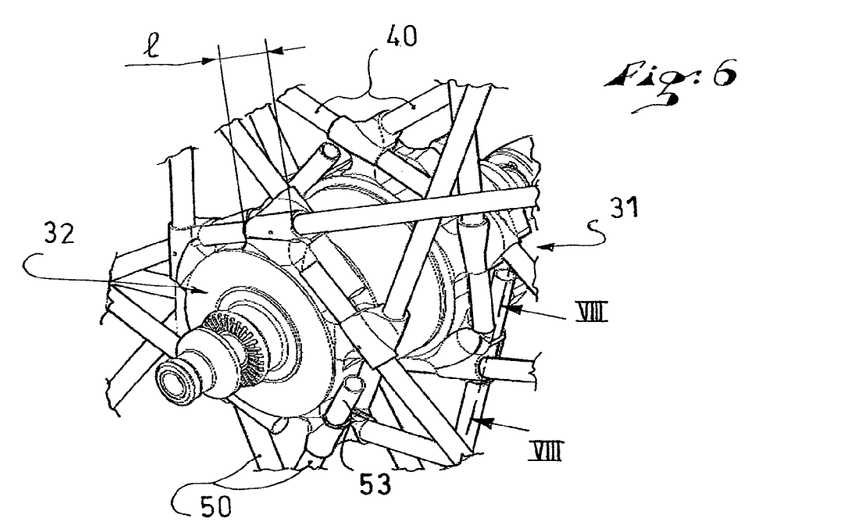
FIG. 6 is a detailed view, on an enlarged scale, of FIG. 5, showing the spoke assembly in the area of the hub.

On each of the flanges 31, 32 are housings 31*a*, 32*a*, respectively, having a generally cylindrical shape and extending along a substantially tangent direction T with respect to the hub in the area of the end or flange 31, 32, respectively. Thus, the wheel can be said to have a tangent or semi-tangent spoke pattern, as known to those skilled in the art. For such a spoke pattern, as can be seen in FIGS. 1 and 6, for example, each spoke crosses at least one other spoke that runs from the same flange of the hub. These housings 31*a*, 32*a* have an inner diameter corresponding substantially to the outer diameter D of the spokes 40, 50 and are adapted to receive the spokes. Furthermore, each housing 31*a*, 32*a* has a length l of approximately 10 to 15 mm (see FIG. 6) in order to facilitate the assembly and, thereafter, the attachment of the spokes 40, 50.

As shown particularly in FIGS. 2 and 8, the housings 31*a*, 32*a* are paired and directed along opposite directions for the paired assembly of two adjacent spokes in the area of each end 31, 32 of the hub. In the example shown, each end 31, 32 comprises five pairs of housings 31*a*, 32*a* distributed evenly along the periphery of the hub.

As shown in FIG. 7, each spoke 40, 50 is provided, at its end 41, 51 adapted to be fixed to the rim 20, with an end piece 42, 52 provided with an external threading 42*a*, 52*a*, respectively, and fixed by an adhesive to the spoke end 41, 51, the latter being closed by means of a stopper, such as stopper 44 in spoke end 41, in order to prevent the adhesive from penetrating within the tube constituting the spoke during the assembly operation on the spoke. Each threaded end 42, 52 is adapted to cooperate with the associated threading of a chimney-shaped opening 22*a* of the rim for fixing the end piece 42, 52 of the spoke end to the rim by screw-threaded engagement. The other end of each spoke is free (see FIG. 8).

The play-free device for each spoke 40, 50 takes the form of glue for gluing a portion of the end 43, 53 of each spoke in the area of the hub and, at the rim, a threaded engagement between its other end and the threaded end piece 42, 52. Therefore, the connection between the spoke and the rim and the connection between the spoke and the hub has no opportunity for "play," i.e., no opportunity for movement in either direction along the length of the spoke relative to the rim and along the length of the spoke relative to the hub. Such a "play-free" connection can also be said to be a "bi-lateral" or "bi-direction" connection in this same sense, i.e., the connection does not allow movement, at the connection, in either direction along the length of the spoke, for example.

Figure 4:
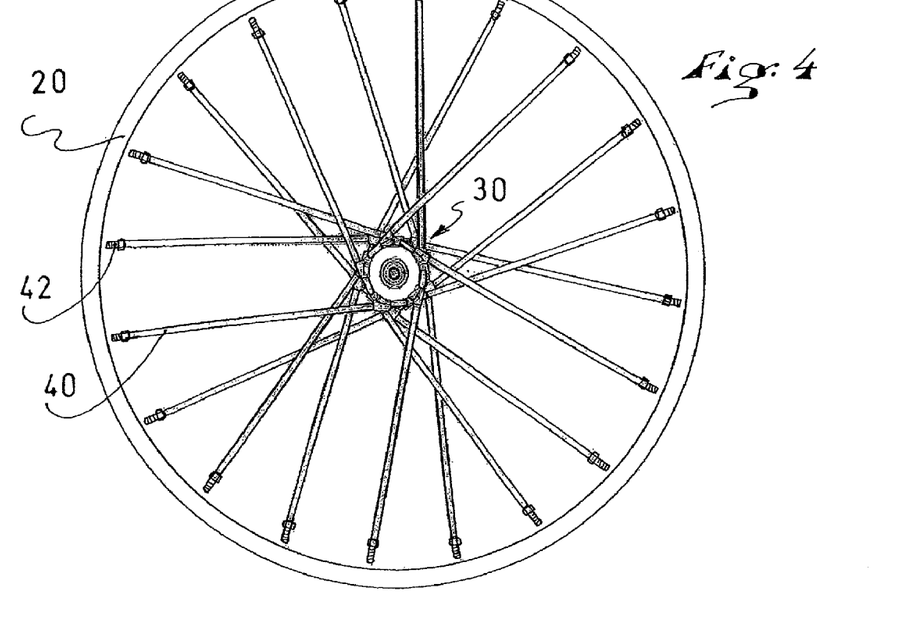
FIGS. 4 and 5 are plan views of the wheel showing the various steps of assembling the spokes.
Figure 5:
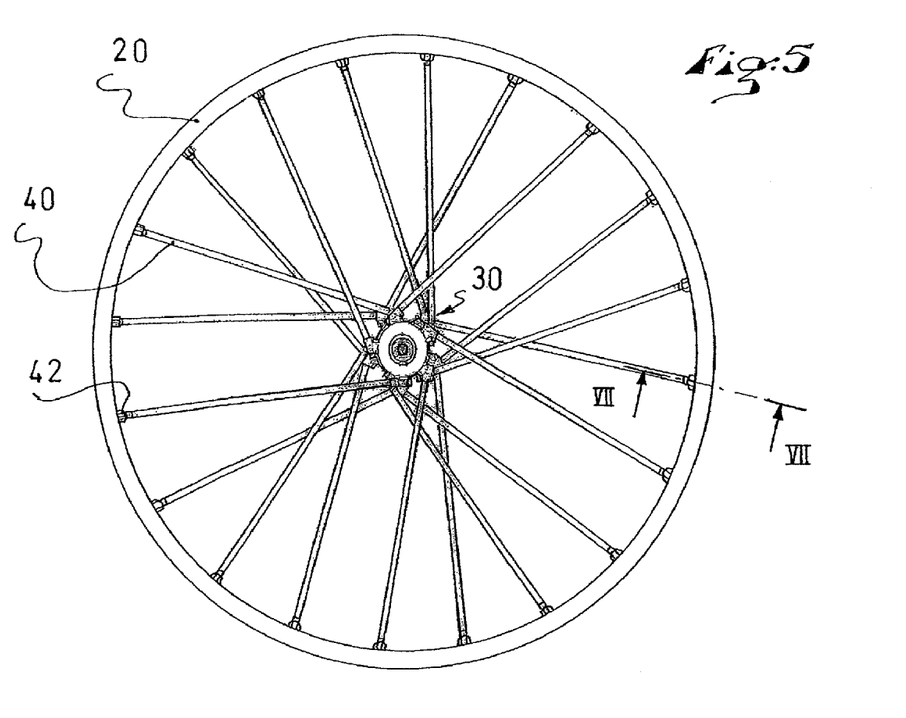

This assembly is carried out as indicated more particularly in FIGS. 4 and 5.

First, the spokes 40, 50 are prepared by cutting the tubes made of pultruded carbon fiber, of which they are formed, to the desired length and by assembling the end pieces 42, 52 by gluing as previously indicated.

This gluing is undertaken after preliminary degreasing of the surfaces for optimum adhesion. This gluing can also be improved by providing an appropriate surface condition (for example, roughness, grooves) within each end piece 42, 52, in order to improve the hold of the adhesive.

The end 43, 53 of each spoke is then inserted into an associated housing 31a, 32a, respectively, of the hub by placing a seal joint, for example an O-ring joint 43a, 53a, on the spoke, in the area of the outlet of the associated housing 31a, 32a (see FIG. 8). The spokes 40, 50 of the same set can be assembled by pairs by means of a flexible band 80 (for example an O-ring seal or ring made out of synthetic material such as Delrin, Polyamide, or Acetate) in order to create a knot and to push back the buckling limits of each spoke in compression. The spokes can be prepared by pairs with their binding band 80 before assembly, as shown in FIG. 10, in order to facilitate such assembly.

The rim 20 is then positioned around the subassembly of the hub 30 and spokes 40, 50, as shown in FIG. 4, these spokes being retracted within their respective housings 31a, 32a in order to enable the correct positioning of the rim around the subassembly, and each end piece 42, 52 is then inserted and screwed into a chimney-shaped opening 22a of the rim. Each housing 31a, 32a therefore constitutes an arrangement for retracting the spokes before final assembly, as well as for guiding and sliding the spokes during the assembly. The whole is positioned on an appropriate unit to guarantee a perfect geometry of the wheel and, in particular, the perpendicularity of the hub axis relative to the plane of the rim and the centering, and the jump of the hub relative to the rim.

The other end 43, 53 of each spoke is then glued in the associated hub housing 31a, 32a, the joint 43a, 53a providing sealing at the time gluing is performed.

As shown in FIG. 8, each housing 31a, 32a, has a cylindrical recess 35 whose diameter is greater than that of the spoke, and which is closed at one end by a shoulder 36 whose diameter is adjusted (play of about 1/100° mm) to that of the spoke 40, 50, and which opens out at the other end, in the area of the O-ring joint 43a, 53a. The adhesive is placed within the recess prior to the assembly of each spoke 40, 50. The small play in the area of the shoulder 36 allows some air to escape during the injection of the adhesive, but also makes it possible to retain the adhesive. The adhesive is inserted, after the spokes are positioned and fixed in the area of the rim, via a hole 70 having a conical shape, for example, arranged radially in each housing 31a, 32a, before the shoulder 36, for example by means of a needle.

In order to guarantee proper gluing, it may be desirable to insert the adhesive prior to fixing the spokes to the rim, and to rotate each spoke in its housing in order to properly wet the gluing interface in the area of the hub and of the spoke.

The adhesive is then allowed to polymerize at room temperature, this solution being preferred if the rim is made of a different material (for example, metal) than the spokes, in order not to induce thermal dilatation of the materials, or in a drying oven at a temperature of about 80° C. As soon as the adhesive is polymerized, the wheel is disassembled from the unit. If polymerization is allowed to occur at room temperature, an additional curing can possibly be performed in order to guarantee complete adhesion.

The adhesive is for example a two-part epoxy resin, such as known under the trade name DP460.

Another alternative assembly can be to screw to the maximum the tubes of the spokes 40, 50 with the end pieces 42, 52 glued beforehand in the rim 20, and then to position the hub 30 in the middle and unscrew the end pieces 42, 52 in order to cause the ends 41, 51 of the spokes to penetrate in the gluing housings 31a, 32a of the hub; this solution requires a particularly long threading of each end piece 42, 52, because it is then unscrewed from the gluing length on the hub side.

On the side of the rim 20, the threaded connection between the rim and the end piece 42, 52 of each spoke must be bilateral in tension/compression, without play. To this end, a polyamide coating, of the "Nylock" type, can be deposited as a device for neutralizing, i.e., eliminating, any play in the connection, i.e., the play of the threading 42a, 52a. Alternatively, the threading can be glued by means of an anaerobic or epoxy adhesive; the end piece can also be screwed home in the chimneys 22a against a shoulder made on the end piece.

Another alternative is the gluing of the carbon tube of the spoke directly in the chimney 22a of the rim; the gluing length is shorter, but the weight of the insert is gained.

The spoke can also be glued in an attached insert that is brazed as described in the patent document EP 1595721.

The spoke can also be glued in a composite rim.

Figure 11:
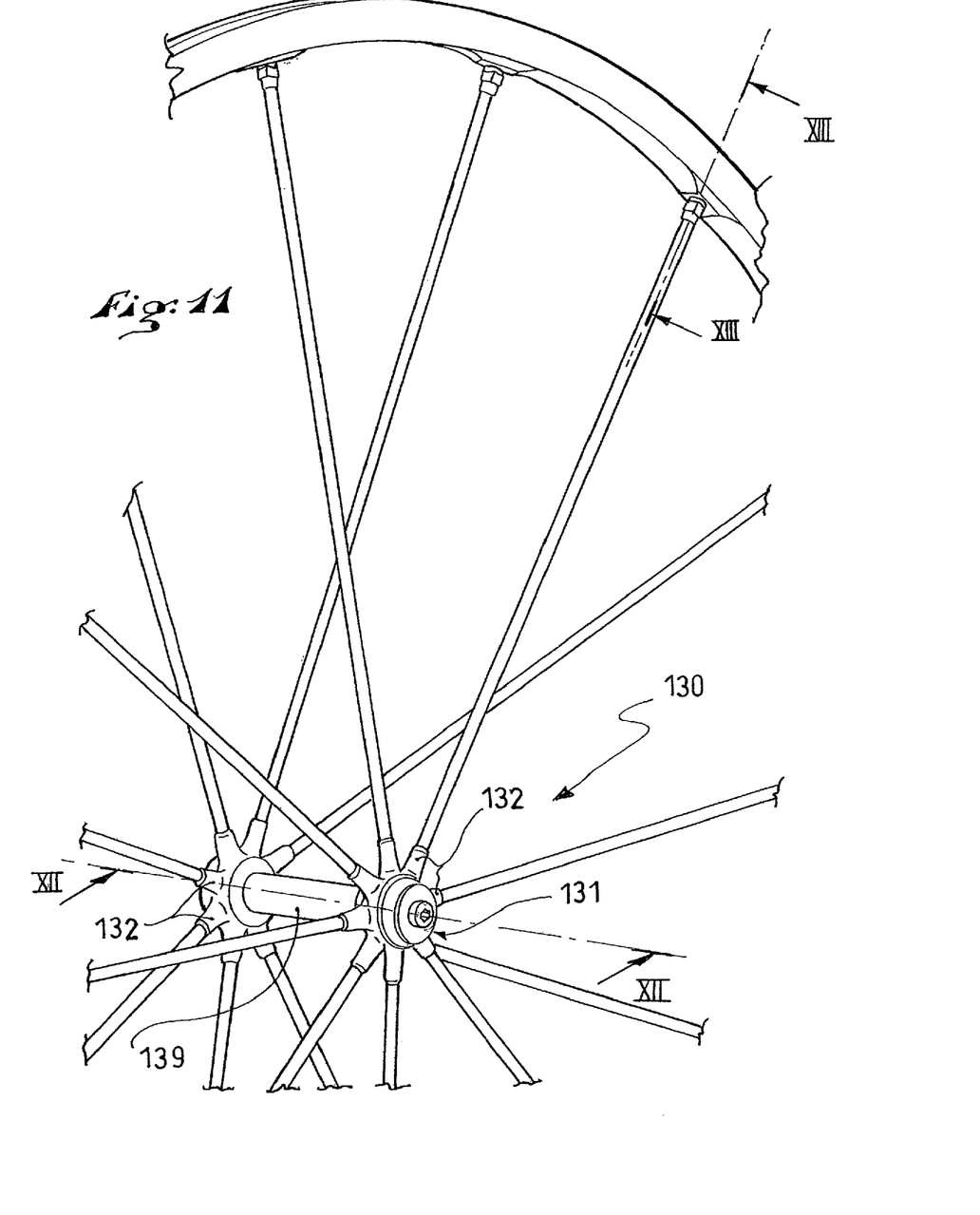
FIG. 11 is a partial perspective view of a wheel according to another embodiment.
Figure 12:
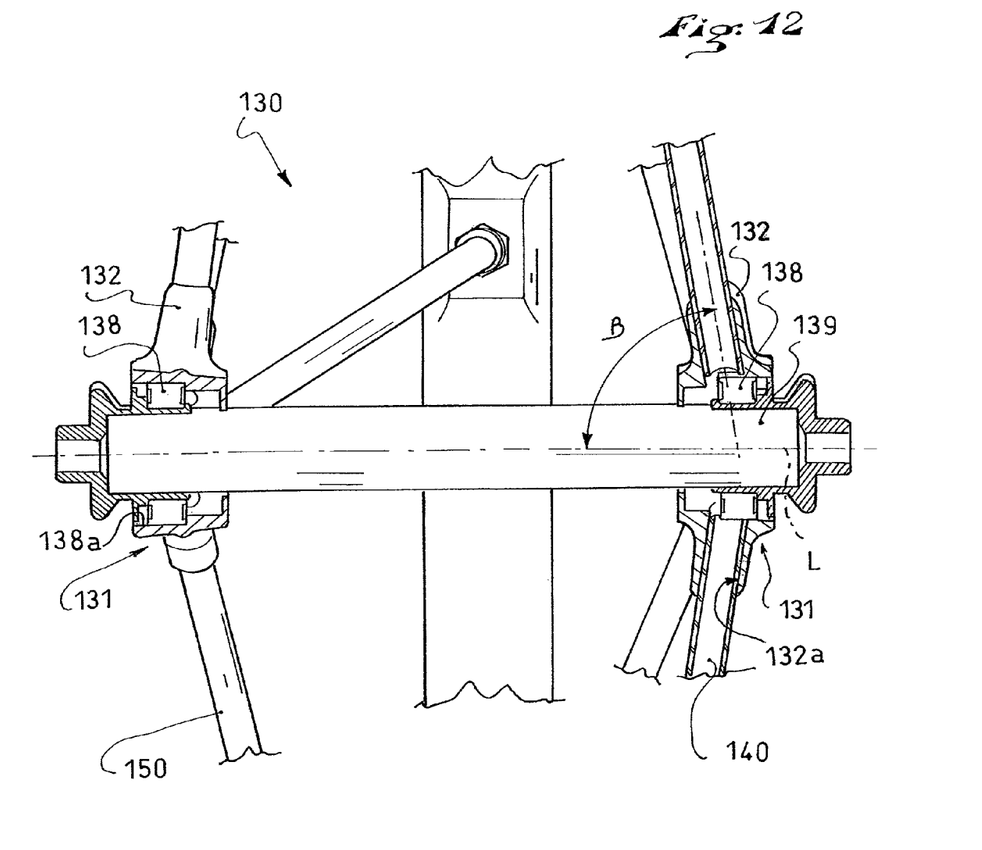
FIG. 12 is a cross-sectional view along the line XII-XII of FIG. 11.
Figure 13:
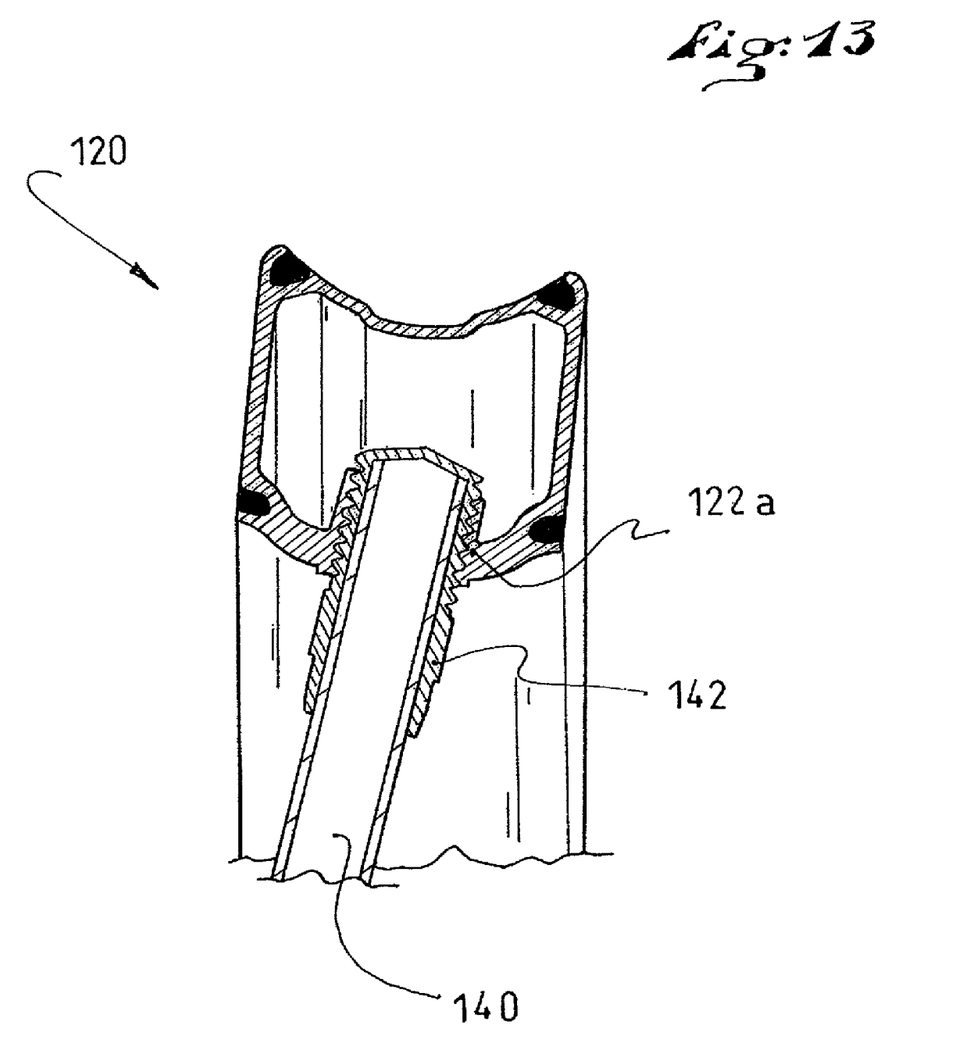
FIG. 13 is a cross-sectional view along the line XIII-XIII of FIG. 11.

FIGS. 11 to 13 illustrate another embodiment, in which similar elements are designated by the same reference numerals increased by 100. The hub 130 is reduced to the bare and comprises only two flanges 131 rotatably mounted on a shaft 139 of the hub by means of bearings 138. The flanges 131 are identical in this case, and comprise substantially radial chimney-shaped openings 132 defining cylindrical housings 132a for each spoke 140, 150, each chimney 132 forming an angle β of about 82.5° with respect to the longitudinal axis L of the hub. In other words, the flanges 131 of the hub are not connected to one another by a body, in contrast with the conventional hubs or to the hub of the preceding embodiment. Thus, in this embodiment, the wheel can be said to have a radial spoke pattern. For such a spoke pattern, as can be seen in FIG. 11, for example, each spoke extends from hub to rim without crossing another spoke that runs from the same flange of the hub.

In this embodiment, as in the preceding embodiment, the spokes 140, 150 are attached by gluing within the chimneys 132 of the flanges 131 after the relative positioning of the spokes/rim/hub according to the process described above. The spokes 140, 150 are assembled prior to positioning the bearings 138, so as to be capable of sliding in their housing 138a during the assembly.

Such a hub construction without body between the flanges 131 is made possible due to the elimination of any tension in the spokes 140, 150 in the free state (non loaded state) of the wheel.

In a conventional tension spoke wheel construction, a hub construction, such as known, for example from U.S. Pat. No. 5,647,643, would not be viable. Indeed, in this type of hub, the spoke tension has the effect of producing an axial load of about 700 N between two opposite spoke sets; this force is taken up axially by the two bearings, which produces on each bearing a considerable friction torque that generates a loss of power that negatively affects the cyclist's performance; moreover, this substantial axial force damages the bearings very quickly. The elimination of the spoke tension according to the invention cancels this axial force completely and therefore makes this construction completely functional and possible.

In this embodiment, the assembly of the spokes on the rim side can be carried out as shown in FIG. 13, i.e., in the same manner as shown in FIG. 7, the only difference being that the spokes 140, 150 are provided with an end piece 142 but do not include a stopper. A stopper can also be provided, however.

Alternatively, according to the invention, the wheel can be very lightly axially pre-stressed in order to preload the bearings in one direction, and thus to cancel their radial play by a small axial pre-stressing. In a particular embodiment, in this type of construction, the thrust center (and substantially the center of the bearing) of the ball bearings 138 are located at the convergence point of the various spokes 140, 150. Indeed, by neglecting the effect of spoke bending and by considering only the axial component of the traction or compression, the resultant of the spoke set always passes through the convergence points of the spokes of the set. Therefore, the annular bearing works under good conditions, without any lateral torsional buckling moment.

The present invention is not limited to the particular embodiments described hereinabove by way of non-limiting examples, and encompasses all similar or equivalent embodiments.

Thus, the spokes can have a cross section that is not necessarily tubular, for example, I-shaped, and/or a shape of evolution (for example, the shape of a "barrel", with a median zone having a larger cross section), or the spokes can be made of a non-composite material, for example a metallic material. Furthermore, differential expansion of the rim with respect to the spokes (related to change in conditions caused by gluing), or the inflation of the tire or other factors (slight pre-stressing of the rim in its assembly by gluing), can produce slight tensile/compressive stresses in the spokes, without leaving the scope of the invention, these stresses being considered as minor and the spokes then still being assembled almost without tension or compression.

The invention claimed is:

1. A spoked wheel comprising:
a peripheral rim;
a central hub;
a plurality of spokes assembled without tension or compression in a free state with no load on the wheel, said plurality of spokes extending length-wise between the rim and the hub;
each of said spokes of said plurality of spokes being structured and arranged to withstand a compressive load of at least 60 daN without buckling;
each of said spokes of said plurality of spokes comprising a first end and a second end;
a device for play-free connection, of at least one of said first and second ends of each of said spokes of said plurality of spokes to the rim or to the hub, said play-free connection device of each of the spokes being a bi-directional connection device structured and arranged for preventing play length-wise along the spokes.

2. A spoked wheel according to claim 1, wherein:
each said play-free connection device comprises a device for neutralizing any connection play.

3. A spoked wheel according to claim 2, wherein:
said play-free connection device is a threaded connection device;
said device for neutralizing any connection play is glue.

4. A spoked wheel according to claim 2, wherein:
said play-free connection device is a threaded connection device;
said device for neutralizing connection play is a polyamide coating.

5. A spoked wheel according to claim 1, wherein:
said plurality of spokes number greater than ten.

6. A spoked wheel according to claim 1, wherein:
each of the spokes of said plurality of spokes comprises a tubular body having an outer diameter greater than 4.8 mm and an inner diameter less than 15 mm.

7. A spoked wheel according to claim 6, wherein:
each of the spokes of said plurality of spokes comprises a pultruded carbon tubular body.

8. A spoked wheel according to claim 1, wherein:
each spoke of said plurality of spokes has a resistance to compression force characterized by a product E·I greater than $10^6$ Nmm$^2$.

9. A spoked wheel according to claim 1, wherein:
the plurality of spokes assembled without tension or compression in a free state with no load on the wheel comprises a plurality of spokes having been assembled to the rim and hub without tension or compression in a free state with no load on the wheel.

10. A spoked wheel according to claim 1, wherein:
the plurality of spokes comprises a plurality of individual spokes, each of the individual spokes having opposite longitudinally spaced-apart ends with respective end surfaces, said ends being connected, respectively, to the rim and the hub.

11. A spoked wheel according to claim 1, wherein:
each of said spokes of said plurality of spokes being structured and arranged to withstand a net load in compression of at least 60 daN without buckling.

12. A spoked wheel according to claim 1, wherein:
said plurality of spokes number greater than ten;
each of the spokes has an outer diameter of no less than 4.8 mm and an inner diameter of less than 15 mm;
each of the spokes is made of carbon fiber.

13. A spoked wheel according to claim 12, wherein:
each of the spokes has a resistance to compression force characterized by a product E·I greater than $10^6$ Nmm$^2$.

14. A spoked wheel according to claim 1, wherein:
the spokes are arranged in a tangent spoke pattern.

15. A spoked wheel according to claim 1, wherein:
the spokes are arranged in a radial spoke pattern.

16. A spoked wheel comprising:
a peripheral rim;
a central hub;
a plurality of spokes assembled without tension or compression in a free state with no load on the wheel, said plurality of spokes extending length-wise between the rim and the hub;
each of said spokes of said plurality of spokes being structured and arranged to withstand a compressive load of at least 60 daN without buckling;
each of said spokes of said plurality of spokes comprising a first end and a second end;
a device for play-free connection of said first end of each respective spoke to one of the rim and hub for preventing play length-wise along each respective spoke;
said second end being fixed to another of the rim and hub with glue.

17. A spoked wheel according to claim 16, wherein:
the hub comprises an arrangement to retract the spokes of said plurality of spokes before final assembly.

18. A spoked wheel according to claim 16, wherein:
the hub comprises an arrangement to retract and to guide and slide each of the spokes of said plurality of spokes before final assembly.

19. A spoked wheel comprising:
a peripheral rim;
a central hub;

a plurality of spokes assembled without tension or compression in a free state with no load on the wheel, said plurality of spokes extending length-wise between the rim and the hub;

each of said spokes of said plurality of spokes being structured and arranged to withstand a compressive load of at least 60 daN without buckling;

each of first and second ends of each of the spokes is either a free end or a threaded end.

20. A spoked wheel comprising an assembly of a rim, a hub, spokes extending between the rim and the hub, and longitudinally adjustable connections between respective ones of the spokes and at least one of the rim and the hub, said spokes being structured and arranged to withstand a net compressive load of at least 60 daN without buckling, said wheel being made by a method comprising the following:

assembling the spokes to the rim and to the hub;

said assembling of the spokes to the rim and the hub comprising setting the longitudinally adjustable connections to provide a longitudinal load level in the spokes with neither tension nor compression in a free state with no load on the wheel.

21. A method of assembling a non-tensioned spoked bicycle wheel, said wheel comprising a rim, a hub, and spokes extending between the rim and the hub, said method comprising:

obtaining at least ten spokes, each of the spokes having a single predetermined length extending between a first end and second end, each of the spokes being structured and arranged to withstand a net compressive load of at least 60 daN applied longitudinally along each said spoke without buckling;

connecting all of the spokes to one of the hub and rim by inserting the first ends of all of the spokes into respective openings or housings of said one of the hub and rim;

connecting all of the spokes to another of the hub and rim by inserting the second ends of all of the spokes into respective openings or housings of said another of the hub and rim;

setting a longitudinal load level in each of the spokes in a free state, connected between the hub and rim with no load on the wheel, to be zero tension and zero compression;

fixing all of the first ends of the spokes to said one of the hub and rim with glue.

22. A method of assembling a non-tensioned spoked bicycle wheel according to claim 21, said method further comprising:

fixing all of the second ends of the spokes to said one of the hub and rim with threaded connections.

23. A method of assembling a non-tensioned spoked bicycle wheel according to claim 21, said method further comprising, between the connecting all of the spokes to one of the hub and rim and the connecting all of the spokes to another of the spokes to one of the hub and rim, the following:

retracting the spokes within said respective openings or housings for facilitating a correct positioning of the hub relative to the rim or the rim relative to the hub.

24. A method of assembling a non-tensioned spoked bicycle wheel according to claim 21, wherein:

said obtaining at least ten spokes comprises preparing the at least ten spokes for assembly by cutting ten carbon fiber tubes at a determined length.

25. A method of assembling a non-tensioned spoked bicycle wheel according to claim 21, wherein:

said obtaining at least ten spokes comprises preparing the at least ten spokes for assembly by fixing an end piece upon one of the first and second ends of each of the at least ten spokes, each of said end pieces having an external thread for threaded engagement with one of the rim and hub.

* * * * *